United States Patent
Kleinert

(10) Patent No.: US 9,434,787 B2
(45) Date of Patent: Sep. 6, 2016

(54) CELLULOSE ETHERS HAVING REACTIVE ANCHOR GROUP, MODIFIED CELLULOSE ETHERS OBTAINABLE THEREFROM AND METHODS FOR THE PREPARATION THEREOF

(71) Applicant: SE Tylose GmbH & Co. KG, Wiesbaden (DE)

(72) Inventor: Mike Kleinert, Mainz (DE)

(73) Assignee: SE Tylose GmbH & Co. KG, Wiesbaden (DE)

( * ) Notice: Subject to any disclaimer, the term of this patent is extended or adjusted under 35 U.S.C. 154(b) by 29 days.

(21) Appl. No.: 14/645,700

(22) Filed: Mar. 12, 2015

(65) Prior Publication Data

US 2015/0183887 A1     Jul. 2, 2015

Related U.S. Application Data

(62) Division of application No. 14/029,970, filed on Sep. 18, 2013, now Pat. No. 9,040,680.

(30) Foreign Application Priority Data

Sep. 28, 2012 (DE) ......................... 10 2012 019 134

(51) Int. Cl.
| | | |
|---|---|---|
| *C08B 11/14* | (2006.01) | |
| *C08B 11/16* | (2006.01) | |
| *C08B 11/193* | (2006.01) | |
| *C08L 1/26* | (2006.01) | |
| *C08B 11/145* | (2006.01) | |
| *C08B 11/02* | (2006.01) | |
| *C08B 11/06* | (2006.01) | |
| *C08B 11/08* | (2006.01) | |
| *C08L 1/28* | (2006.01) | |

(52) U.S. Cl.
CPC .............. *C08B 11/145* (2013.01); *C08B 11/02* (2013.01); *C08B 11/06* (2013.01); *C08B 11/08* (2013.01); *C08B 11/193* (2013.01); *C08L 1/26* (2013.01); *C08L 1/28* (2013.01); *C08L 1/282* (2013.01); *C08L 1/284* (2013.01); *C08L 1/288* (2013.01)

(58) Field of Classification Search
CPC ......... C08B 11/14; C08B 11/16; C08L 1/288
See application file for complete search history.

(56) References Cited

U.S. PATENT DOCUMENTS 3,280,026 A    10/1966 McCoy, Jr.

FOREIGN PATENT DOCUMENTS

| DE | 19708531 A1 | 9/1998 |
| WO | WO 00/08058 A1 | 2/2000 |
| WO | WO 2005/058971 A1 | 6/2005 |
| WO | WO 2008/112419 A2 | 9/2008 |

OTHER PUBLICATIONS

Pahimanolis et al., "Surface functionalization of nanofibrillated cellulose using click-chemistry approach in aqueous media," Cellulose 18 (2011) pp. 1201-1212.
Yang et al., "A Novel Cellulose-Based Azide Energetic Material: 1-Azido-2-hydroxypropyl Cellulose Ether," J. Energetic Materials 29, (2011) pp. 241-260.
L. Petrus et al.: "Preparation of O-(3-azido-2-hydroxypropyl)cellulose and its photolysis to O-(2-formyl-2-hydroxyethyl)cellulose," Chem. Papers 40 (4), (1986), pp. 519-522.
Michael Slater et al.: "Click Chemistry" in the Preparation of Porous Polymer-Based Particulate Stationary Phases for [mu]-HPLC Separation of Peptides and Proteins, Analytical Chemistry, vol. 78, No. 14, Jul. 1, 2006, pp. 4969-4975.
Eissa et al., Carbohydrate Polymers, 2012, 90, Available online Jun. 18, 2012, pp. 859-869.
Edgar, K.J., Cellulose Ethers, Encyclopedia of Polymer Science and Technology, 2004, John Wiley & Sons, vol. 5, pp. 507-532.

*Primary Examiner* — Jonathan S Lau
(74) *Attorney, Agent, or Firm* — ProPat, L.L.C.

(57) ABSTRACT

Non-ionic water-soluble cellulose ethers modified with 3-azido-2-hydroxypropyl groups bound via an ether link are provided having a molar degree of substitution $MS_{AHP}$ in the range from 0.001 to 0.50. Exemplary cellulose ethers are alkyl cell doses, including methyl, hydroxyalkyl (e.g. hydroxyethyl hydroxypropyl) or alkylhydroxyalkyl cellulose (e.g. methylhydroxyethyl). Reaction products with alkyne compounds are also provided, resulting in a terminal alkyne group. The reaction of azide with the alkyne proceeds as a 1,3-dipolar cycloaddition reaction, advantageously with Cu(I) or ruthenium catalysts. A multiplicity of cellulose ethers can be obtained from the conversion reaction. Variations in the macroscopic properties can be achieved by controlled modification, ranging from increased or reduced viscosity. The reaction, taking place within a few seconds, requires only minimal catalyst. Gel formation is reversible by adjustment of the pH such that a monophasic system (high-viscous fluid) arises again from a biphasic system (gel+low-viscous water phase).

14 Claims, 3 Drawing Sheets

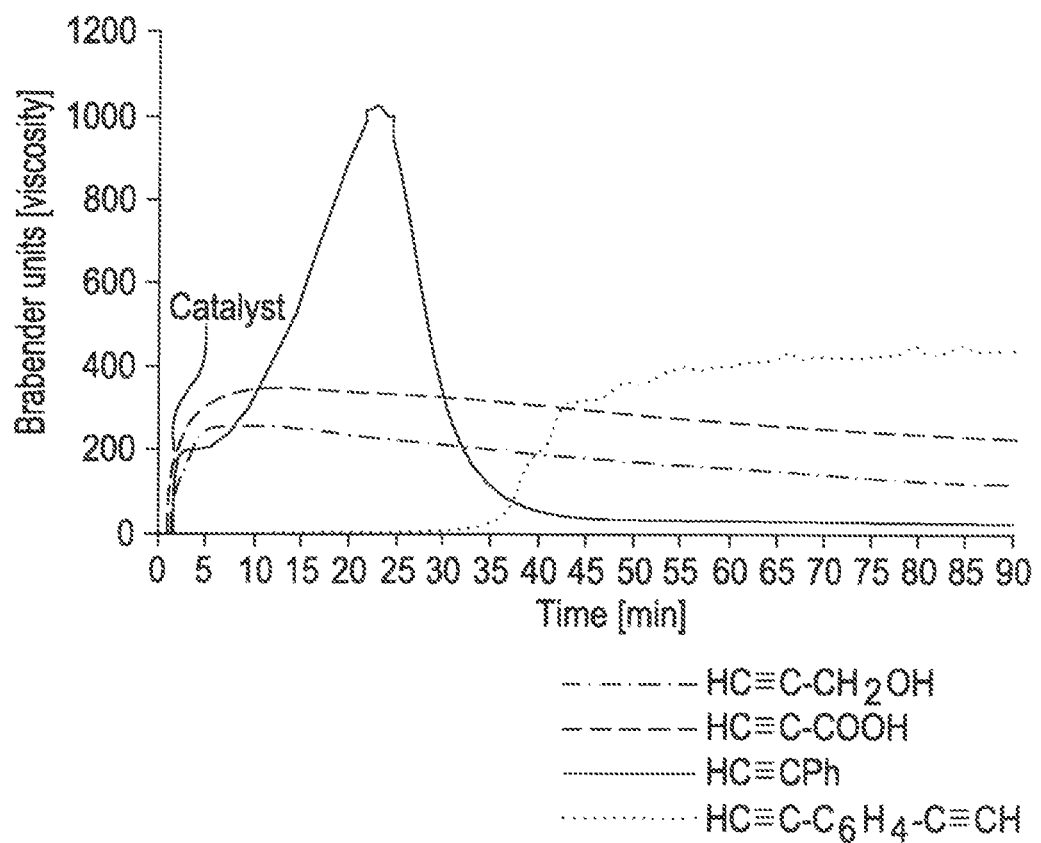

CELLULOSE ETHERS HAVING REACTIVE ANCHOR GROUP, MODIFIED CELLULOSE ETHERS OBTAINABLE THEREFROM AND METHODS FOR THE PREPARATION THEREOF

CROSS-REFERENCE TO RELATED APPLICATIONS

This divisional application claims priority to U.S. application Ser. No. 14/029,970, filed Sep. 18, 2013, allowed, which claims priority to parent German Patent Application No. 10 2012 019 134.0 filed Sep. 28, 2012, both of which are hereby incorporated herein by reference in their entirety.

FIELD OF THE INVENTION

The invention relates to water-soluble cellulose ethers having reactive anchor groups, and also modified cellulose ethers which are obtainable from these intermediates. In addition, the invention relates to methods for preparing the end products. The rheological properties of the end products can be controlled in a modular modifiable manner. A switchable alteration of the rheology can be achieved in the course of the application.

BACKGROUND OF THE INVENTION

Water-soluble cellulose ethers, particularly non-ionic cellulose ethers, are used in many fields. Of particular note is the application in ready-mixed concrete, pneumatically applied mortar or emulsion paints. In addition, the use as tablet coatings is also of importance. It is desirable to specifically match the properties of the cellulose to the particular use. The rheological properties of the cellulose ethers are particularly important in aqueous systems.

For adjusting the rheological properties, cellulose ethers are chemically modified on an industrial scale.

Hydrophobically modified cellulose ethers are one example which establish a sufficient viscosity in a narrowly limited low to medium shear range. The hydrophobic modification is carried out, by example, by reacting a cellulose ether with hexadecyl glycidyl ether. Even a few hydrophobic groups (DS <0.1) are sufficient to produce an associative interaction between the cellulose chains. The shear viscosity is thereby increased in aqueous solutions. Such hydrophobically modified cellulose ethers are used, for example, in emulsion paints. The emulsion paints can then be applied with considerably reduced spray tendency.

Also known are cellulose ethers modified with allyl groups. The modification is achieved by reacting cellulose ether with allyl glycidyl ether. Ally-modified hydroxyethyl celluloses are used industrially, for example, as protective colloids in emulsion polymerisation. A low degree of substitution of allyl groups (DS allyl) in the cellulose ether is also sufficient here to cause the desired alteration in properties (DE 19708531). The yield, based on the allyl glycidyl ether used, is generally low to moderate at ca. 15 to 40% for which reason alternatives here have also been sought.

SUMMARY OF ADVANTAGEOUS EMBODIMENTS OF THE INVENTION

The object therefore continues to be to make available cellulose ethers having "bespoke" properties. In particular, the rheological properties in aqueous solution should be adjustable. For example, cellulose ethers having "switchable" alterations in properties are desirable which initially have a low viscosity in aqueous solution and only later, following a corresponding modification in the application, have a higher viscosity. For example, water-based paints with high end-use viscosity could then be mixed beforehand with considerably lower energy expenditure. The end-user should have the possibility to change the viscosity and solubility properties by addition of a small amount of catalyst.

It has now been found that cellulose ethers with customised properties can be produced from an intermediate having azido groups. In a copper-catalysed 1,3-dipolar cycloaddition reaction (Huisgen reaction), the azido groups are reacted with terminal alkynes. A multiplicity of modified radicals can be incorporated in the cellulose ether with the alkynes.

The invention therefore provides a non-ionic, water-soluble cellulose ether having 3-azido-2-hydroxypropyl groups, which are bound to the cellulose via an ether link. The cellulose ethers have alkyl and/or hydroxyalkyl groups in addition to the 3-azido-2-hydroxypropyl groups.

BRIEF DESCRIPTION OF THE DRAWINGS

FIG. 3 graphically illustrates changes occurring during the course of an exemplary cycloaddition reaction.

DETAILED DESCRIPTION OF ADVANTAGEOUS EMBODIMENTS OF THE INVENTION

Preferred starting materials are the corresponding water-soluble, non-ionic cellulose ethers, such as hydroxyethyl cellulose (HEC), methylhydroxyethyl cellulose (MHEC), hydroxypropyl cellulose (HPC) or methylhydroxypropyl cellulose. For methylhydroxyethyl celluloses and methylhydroxypropyl celluloses the DS(Me) is generally 1.0 to 2.5, preferably 1.2 to 2.5, particularly preferably 1.4 to 1.9, and the MS (HE or HP) generally 0.01 to 1.0, preferably 0.05 to 0.8, particularly preferably 0.05 to 0.6. For hydroxyethyl celluloses and hydroxypropyl celluloses the MS(HE or HP) is generally 1.0 to 4.0, preferably 1.5 to 3.3. In the context of the present invention, "water-soluble" means that the unmodified cellulose ether is completely soluble at more than 1.0% (w/w) in cold water.

The cellulose or the cellulose ether is then reacted with glycidyl azide (1-azido-2,3-epoxypropane, azidomethyloxirane; CAS No. 80044-09-3). The glycidyl azide (GA) is obtainable from epichlorohydrin and sodium azide. In place of glycidyl azide, 1-azido-3-chloropropan-2-ol can also be used as a retrosynthetic precursor of glycidyl azide. In each case the cellulose ether must be activated beforehand with a base, e.g. with aqueous NaOH.

The reaction of nanofibrillated cellulose with glycidyl azide in aqueous medium has already been described in the literature. In this case, glycidyl azide is added to alkalised cellulose (*Cellulose* 18 [2011] 1201-1212). However, the cellulose is only etherified on the surface and consequently insufficiently etherified such that a degree of substitution of azidoglycidyl substituents in the range of only 0.007 to 0.07 per unit of anhydroglucose is achieved. These products are not suitable as water-soluble additives for adjusting the rheological properties of an aqueous composition since they are insoluble in water.

The reaction of cellulose with glycidyl azide has also been described by Yang et al. (*J. Energetic Materials* 29 [2011] 241-260). The aim here was 1-azido-2-hydroxypropyl cellulose ethers having a high proportion of nitrogen (ca. 10% by weight) and a corresponding high degree of substitution with azidohydroxypropyl groups ($MS_{AHP}$ ca. 0.5 and above) for use in explosives technology. Such products, however, are insoluble in water and organic solvents and, in this respect, do not come close to the aim of water-soluble cellulose ethers according to the invention, particularly on the basis of hydroxyethyl cellulose, specifically azidohydroxypropyl-hydroxyethyl cellulose, as starting material.

The modified cellulose ethers according to the invention are not comparable with the cellulose ethers described in the prior art since they also contain alkyl and/or hydroxyalkyl groups in addition to azidohydroxypropyl groups.

Figure 1:
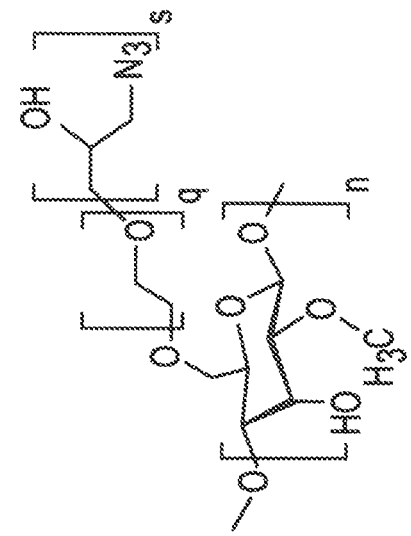
FIG. 1 illustrates the formation of exemplary cellulose ethers having 3-azido-2-hydroxypropyl substituents via glycidyl azide.
Figure 1:
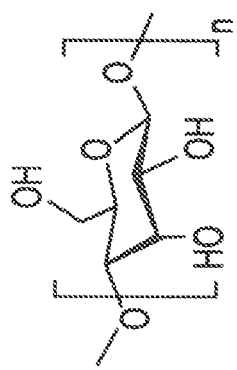

Cellulose ethers having 3-azido-2-hydroxypropyl substituents are formed by the reaction with glycidyl azide. The 3-azido-2-hydroxypropyl groups can be bound to the hydroxyl groups of the ethylene glycol or propylene glycol side chains or to the hydroxyl groups on the pyranose ring (see FIG. 1) and/or be reacted directly with free hydroxy groups of the cellulose ether. The average degree of substitution of the cellulose with the 3-azido-2-hydroxypropyl groups ($MS_{AHP}$) is generally in the range of 0.001 to 0.50 per unit of anhydroglucose; the MS is preferably in the range from 0.01 to 0.30, particularly preferably in the range from 0.05 to 0.25. The cellulose ethers substituted with azido groups according to the invention advantageously have an average degree of polymerisation $DP_n$ of 50 to 3000, preferably 100 to 2500, particularly preferably 250 to 1500.

Cellulose ethers having 3-azido-2-hydroxypropyl groups can also be obtained when alkalised cellulose is reacted with an alkylene oxide and glycidyl azide directly after one another or simultaneously in one and the same reactor in the form of a classical co-etherification.

The use of copper-catalysed azide-alkyne coupling (CuAAC) in cellulose chemistry enables an unprecedented flexibility with respect to the linked molecules due to its high chemical orthogonality compared to the standard industrial reactions. These molecules can be, inter alia, side chains, cross-linking units or else reactive dyes or UV-active chromophores.

Figure 2:
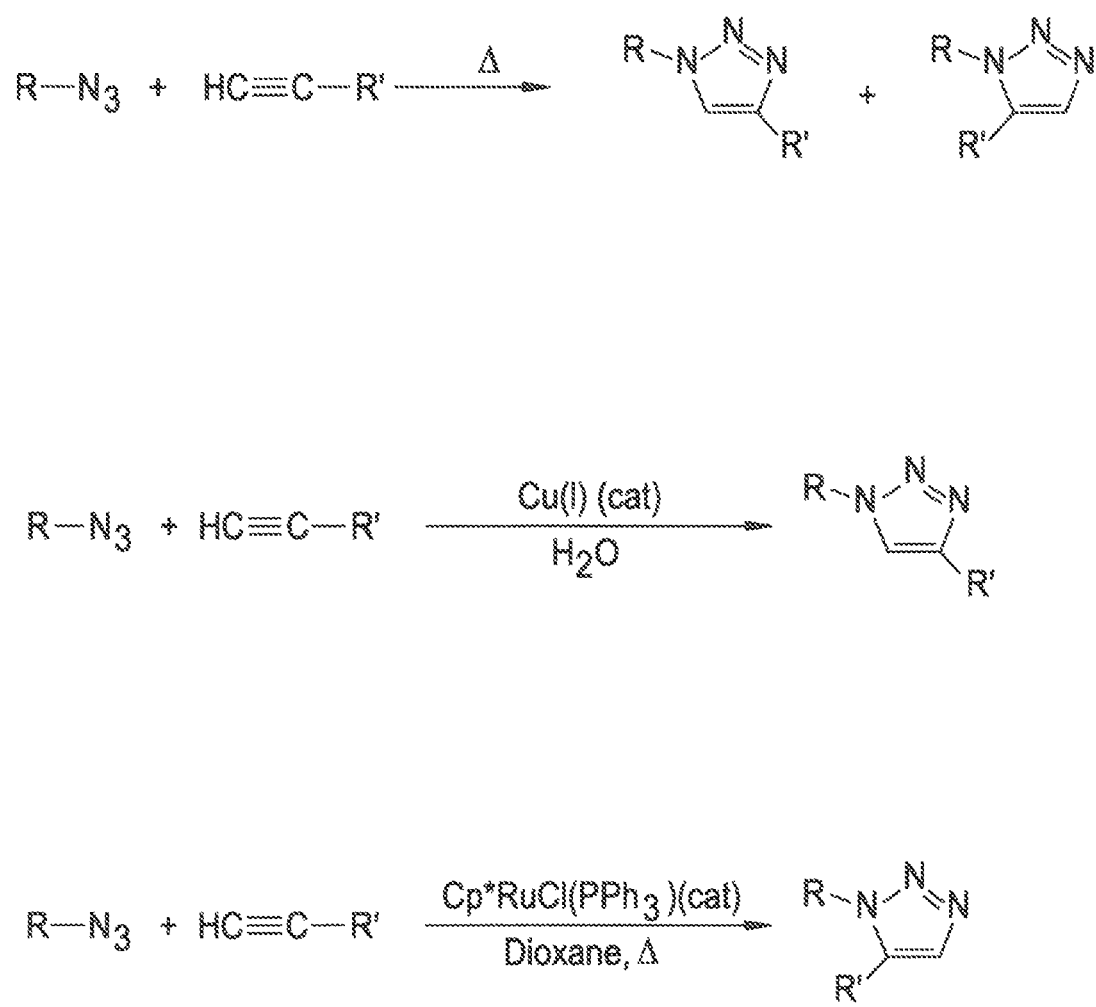
FIG. 2 illustrates exemplary thermally and catalytically induced Huisgen cycloadditions.

Mixtures of regioisomers are formed by the thermally induced Huisgen cycloaddition (see FIG. 2, top). The 1,3-dipolar cycloaddition of azides to alkynes (Huisgen reaction) is therefore advantageously conducted with the aid of Cu(I) catalysts. In this case, 1,4-disubstituted [1,2,3]-triazoles are formed regioselectively (see FIG. 2, middle). Suitable examples are Cu(I) bromide, Cu(I) iodide or Cu(I) acetate. The catalytically active Cu(I) salts can also be prepared in situ, from copper(II) sulfate for example, by reduction with ascorbic acid in aqueous solution. The reaction may optionally be carried out with exclusion of atmospheric oxygen in an inert gas atmosphere (e.g. under nitrogen). The metal-catalysed reactions frequently proceed even at room temperature. The cycloaddition reaction may also optionally be carried out directly by the end user, for example, by a manufacturer of emulsion paints during the formulation of the paints.

The azide-alkyne cycloaddition can also be catalysed by ruthenium compounds, for example by bis(triphenylphosphine)cyclopentadienylruthenium chloride. In this case however, in contrast to the copper-catalysed reaction, 1,5-disubstituted [1,2,3]-triazoles are obtained regioselectively (see FIG. 2, bottom).

Particularly suitable alkynes are phenylacetylene, propargyl alcohol, propiolic acid and other compounds having a terminal C—C triple bond. Compounds having 2 carbon-carbon triple bonds (diynes) may also be used.

Suitable alkyne units in the Huisgen reaction are generally:
a) alkynes of the formula H—C≡C—$R^4$,
   where $R^4$
   is a straight-chain or branched ($C_1$-$C_{18}$) alkyl radical,
   is an alkenyl radical of the formula —$[CH_2]_m$—CH═$CH_2$, where m is a whole number from 1 to 8,
   is a substituted alkyl radical of the formula —$[CH_2]_n$—$CX_2Y$,
   where n is a whole number from 0 to 8, X is hydrogen, fluorine or chlorine and Y is hydrogen, fluorine, chlorine, $NH_2$, OH, O—$CH_3$, $CO_2H$ or $CO_2CH_3$ with the proviso that X and Y are not both simultaneously hydrogen,
   is a polyoxyalkylene radical of the formula —$[CH_2$—$CH_2$—O$]_p$—$CH_2Z$,
   where p is a whole number from 1 to 8 and Z is a hydrogen atom or a methyl group,
   is an aromatic radical, preferably as phenyl, biphenyl or naphthyl group,
   is a substituted aromatic radical, where the substituents bound to the aromatic carbon atoms are identical or different and are selected from the group consisting of H, F, Cl, $NH_2$, $CH_3$ or $OCH_3$, with the proviso that not all substituents are simultaneously hydrogen, or
   is a heterocyclic radical, such as 1H-imidazole-1-carbonyloxymethyl;
or
b) a diyne of the formula H—C≡C—$R^5$—C≡C—H,
   where $R^5$
   is a bivalent aromatic radical, such as ortho-, meta- or para-phenylene, biphenyl-4,4'-diyl or naphthalene-1,4-diyl, or
   is a substituted bivalent aromatic radical, where the substituents bound to the aromatic carbon atoms are identical or different and are selected from the group consisting of H, F, Cl, $NH_2$, $CH_3$ or $OCH_3$, wherein different substituents may also be combined, with the proviso that not all substituents are simultaneously hydrogen.

The cycloaddition reaction can be carried out with many different alkynes. Modified cellulose ethers with vastly differing properties are therefore accessible in a simple manner. The reaction is therefore significantly more flexible than a conventional graft reaction. The reaction can be carried out in the presence of water, organic solvents or mixtures of water with organic solvents. Suitable organic solvents are, for example, tetrahydrofuran, dioxane, dimethyl sulfoxide, acetonitrile, methylene chloride, chloroform, methanol, ethanol, tert-butanol, ethyl acetate, acetone or dimethylformamide.

AHP-HEC is very water soluble and forms a clear, viscous solution in water. It has been found, surprisingly, that the theological properties of the dissolved AHP-HEC can be completely inverted following the reaction with alkyne units, for example, with phenylacetylene. By means of the CuAAC described, products may even be obtained which, starting from a viscous fluid, have the viscoelastic characteristics of solids (gels).

In the course of the cycloaddition reaction, excessive changes in the viscosity can occur, as shown in FIG. 3. Thus, a distinct maximum is passed through after ca. 2.0 min during the Cu(I) catalysed reaction of a (3-azido-2-hydroxypropyl)-hydroxyethyl cellulose with phenylacetylene at room temperature. The viscosity then declines, specifically below the initial value. The viscosity, starting from a low level, can also increase and remain at a high level, as shown by the example of bifunctional 1,3-diethynylbenzene in FIG. 3.

Further radicals can be covalently bound to the alkyne component. The products arising from the cycloaddition reaction may accordingly be ionic or non-ionic. The further radicals can also be reactive dyes, chromophores, cross-linking units or other radicals, which confer particular properties to the reaction products.

The 1,3-dipolar cycloaddition reaction generally takes place within seconds with minimal amounts of catalyst.

The present invention also relates to modified cellulose ethers obtainable by the copper-catalysed 1,3-dipolar cycloaddition (CuAAC) described.

The following examples serve to illustrate the invention. The percentages refer to % by weight unless otherwise stated or are obvious from the context. DS- and MS values were determined by the Zeisel method. Brookfield viscosities were determined using a Brookfield rotational viscometer Model DV-III at 20° C., Brabender viscosities using a Brabender Viscograph Type 800445010 at 20° C.

EXAMPLE 1

Preparation of 1-Azido-2,3-Epoxypropane 46.3 g (0.5 mol) of epichlorohydrin were added with stirring at room temperature to a solution of 84.5 g (1.3 mol) of sodium azide in 415.5 ml of demineralised water. 240 g of glacial acetic acid were then added and the mixture was stirred at 35° C. for 4 hours. The mixture was then cooled to below 20° C. and shaken 4 times with 70 ml each of diethyl ether. The combined organic phases were then concentrated to half their volume under reduced pressure. The organic phase contained the intermediate 1-azido-3-chloropropan-2-ol, which was confirmed by GCMS analysis. The recyclisation should presumably be recyclisation to the end product was carried out following addition of 400 ml of demineralised water and a rapid neutralisation with 10 molar aqueous NaOH solution at ca. 35° C. until a pH of ca. 13 to 14 was reached. The reaction mixture was then immediately extracted twice with 75 ml each time of diethyl ether. The combined ether phases were washed once with 10 ml of demineralised water and then dried with $Na_2SO_4$. The dried ether phase was then concentrated to half its volume under reduced pressure. The yield of 1-azido-2,3-epoxypropane was ca. 60 to 70%, determined by GC analysis. Further purification steps were not required.

EXAMPLE 2

Preparation of Azidohydroxypropylhydroxyethyl Cellulose From Pulp by Co-Etherification In a 2 liter glass reactor, equipped with an anchor stirrer, 85.3 g (0.50 mol) of pine pulp (95% dry fraction) was suspended in 588 g of isopropanol. The reactor was inertised with nitrogen, a solution of 22 g (0.55 mol) of sodium hydroxide in 129.1 g of water was then added and the mixture was further stirred at 25° C. 50.64 ml (1.0 mol) of ethylene oxide were then added, the temperature was increased to 45° C. over a period of 30 min and the mixture was then maintained for one hour at this temperature. 19.4 ml (0.165 mol) of 31% hydrochloric acid were then added with vigorous stirring for partial neutralisation, followed by 43.1 g (0.25 mol) of a 57.5% solution of glycidyl azide in ether (preparation see example 1). The mixture was then heated to 85° C. over a period of 60 min and then maintained at this temperature for a further 90 min. The mixture was then cooled to room temperature. A further 38.9 g (0.33 mol) of 31% hydrochloric acid were then added with vigorous stirring. The mixture was finally neutralised with acetic acid with phenolphthalein being used as indicator. The product was filtered off under suction, washed twice with 85% aqueous, isopropanol and finally with acetone until the salt content of the product was less than 0.5% (determined by conductivity measurement). The product was then dried overnight at 70° C. 111 g of a colourless solid were obtained. The degree of substitution $MS_{EO}$ was determined to be 1.29 and the degree of substitution $MS_{GA}$ to be 0.20. Elemental analysis gave: C, 46.2%; H, 6.8%; N, 3.5%; O 43.5%.

EXAMPLE 3

Preparation of Azidohydroxypropyl-Hydroxyethyl Cellulose by Etherification of Hydroxyethyl Cellulose In a 2 liter glass reactor equipped with a paddle stirrer, 104.0 g (0.40 mol) of hydroxyethyl cellulose (MS(HE): 1.97; TYLOSE® H27NG4 from SE Tylose GmbH & Co. KG) was suspended in 717.8 g of isopropanol. After evacuating and inertising the reactor with nitrogen, a solution of 17.6 g (0.44 mol) of sodium hydroxide in 102.3 g of water were added with stirring at 25° C. and stirring was carried out for a further 30 min at this temperature. Subsequently, 37.8 g (0.14 mol) of a 39.3% ether solution of glycidyl azide were added, the temperature was increased to 40° C. over a period of 10 min and the mixture was stirred a further 90 min at 40° C. For partial neutralisation, 21.7 ml (0.185 mol HCl) of 31% hydrochloric acid were added with vigorous stirring, followed by 37.8 g of a 39.3% solution of glycidyl azide in diethyl ether. The reaction mixture was then heated to 85° C. over a period of 60 min and maintained at this temperature for a further 90 min before being cooled to room temperature. A further 17.4 g (0.15 mol) of 31% hydrochloric acid were added with vigorous stirring. Finally the mixture was fully neutralised with acetic acid (with phenolphthalein as pH indicator). The product was filtered under suction, washed twice with 85% aqueous isopropanol and then with acetone until the salt content was less than 0.5%. After drying overnight at 70° C., 104 g of a colourless solid were obtained. A value of 1.92 was determined for the molar degree of substitution MS(HE) and a value 0.40 for the molar degree of substitution MS(AHP). Elemental analysis gave: C, 44.4%; H, 7.2%; N, 5.8%; O, 42.6%.

EXAMPLE 4

Preparation of Azidohydroxypropylmethylhydroxyethyl Cellulose by Etherification of MHEC In a 2 liter glass reactor equipped with a paddle stirrer, 83.9 g (0.30 mol) of methylhydroxyethyl cellulose (DS(Me)

1.73; MS(HE) 0.12; TYLOSE® MH 50 G4) were suspended in 578.9 g of isopropanol. After evacuating and inertising with nitrogen, a solution of 13.2 g (0.33 mol) of NaOH in 75 g of water was added with stirring at 25° C. and the mixture was further stirred at this temperature for 25 min. Then, 8.1 g (0.038 mol) of a 46.2% ether solution of glycidyl azide were added, the temperature was increased to 40° C. over a period of 10 min and the mixture was maintained at this temperature a further 90 min. For partial neutralisation, 19.4 ml (0.165 mol) of 31% hydrochloric acid were then added with vigorous stirring. Subsequently, a further amount of 8.1 g (0.038 mol GA) of a 46.2% solution of glycidyl azide in diethyl ether were added. The mixture was increased to a temperature of 85° C. over is period of 60 min and maintained at this temperature for 90 min before being cooled to room temperature. A further 15.5 g of 31% hydrochloric acid (0.13 mol HCl) were added with vigorous stirring. The mixture was then fully neutralised with acetic acid (against phenolphthalein). The product was filtered off under suction and washed three times with acetone until the salt content was less than 0.5%. After drying overnight at 70° C., 60.9 g of a colourless solid remained. MS(HE): 0.11; MS(GA): 0.047; DS(Me): 1.64. Elemental analysis gave: C, 46.8%; H, 7.3%; N, 1.3%; O, 44.6%.

EXAMPLE 5

Copper-Catalysed Coupling of Azidohydroxypropylhydroxyethyl Cellulose with Phenylacetylene 3.57 g of azidohydroxypropyl-hydroxyethyl cellulose (95.5% solid fraction; MS(HE): 1.1; MS(GA): 0.11) were added to 380 ml of demineralised water and the mixture was stirred at room temperature until a clear, colourless, viscous solution had formed. The Brookfield viscosity was 153 mPa·s and the viscosity according to the Brabender method was 156 Brabender units. The mixture was transferred to a Brabender beaker and 0.78 g (7.7 mmol, 4.5 equivalents relative to MS(GA): 0.11) of phenylacetylene was added, followed by a solution of 0.19 g (0.77 mmol) of copper sulphate pentahydrate and 0.34 g (1.92 mmol) of ascorbic acid in 2 ml of demineralised, degassed water. The viscosity-time course was monitored. The initially colourless, solution became intense yellow during the reaction. After completion of the reaction, a yellow, semi-solid, gel-like solid settled out overnight at the bottom of the container beneath a clear, colourless, low-viscous aqueous supernatant. The gel could be taken up again into solution by acidification with hydrochloric acid, whereby the viscosity of the supernatant again increased significantly. By alkalising with NaOH to a pH range >8, a solid again precipitated.

That which is claimed:

1. Non-ionic, water-soluble cellulose ether comprising 3-azido-2-hydroxypropyl (AHP) groups bound to the cellulose via an ether link,
   wherein the AHP groups have a molar degree of substitution $MS_{AHP}$ in the range from 0.001 to 0.50,
   and the 3-azido-2-hydroxypropyl groups have been reacted with an alkyne in a cycloaddition reaction.

2. Cellulose ether according to claim 1, wherein the alkyne
   a) is a compound of the formula H—C≡C—R$^4$,
      where R$^4$
      is a straight-chain or branched ($C_1$-$C_{18}$) alkyl radical,
      is an alkenyl radical of the formula —[$CH_2$]$_m$—CH=$CH_2$, where m is a whole number from 1 to 8,
      is a substituted alkyl radical of the formula —[$CH_2$]$_n$—$CX_2$Y,
      where n is a whole number from 0 to 8, X is hydrogen, fluorine or chlorine and Y is hydrogen, fluorine, chlorine, $NH_2$, OH, O—$CH_3$, $CO_2$H or $CO_2CH_3$ with the proviso that X and Y are not both simultaneously hydrogen,
      is a polyoxyalkylene radical of the formula —[$CH_2$—$CH_2$—O]$_p$—$CH_2$Z,
      where p is a whole number from 1 to 8 and Z is a hydrogen atom or a methyl group,
      is an aromatic radical,
      is a substituted aromatic radical, where the substituents bound to the aromatic carbon atoms are identical or different and are selected from the group consisting of —H, —F, —Cl, —$NH_2$, —$CH_3$ or —$OCH_3$, with the proviso that not all substituents are simultaneously hydrogen, or
      is a heterocyclic radical;
   or
   b) is a diyne of the formula H—C≡C—R$^5$—C≡C—H, where R$^5$
      is a bivalent aromatic radical or
      is a substituted bivalent aromatic radical, where the substituents bound to the aromatic carbon atoms are identical or different and are selected from the group consisting of H, F, Cl, $NH_2$, $CH_3$ or $OCH_3$, with the proviso that not all substituents are simultaneously hydrogen.

3. Cellulose ether according to claim 2, wherein the aromatic radical is a phenyl, biphenyl or naphthyl group and the bivalent aromatic radical is ortho-, meta- or para-phenylene, biphenyl-4,4'-diyl or naphthalene-1,4-diyl.

4. Cellulose ether according to claim 1, wherein the alkyne is phenylacetylene, propargyl alcohol, propiolic acid or propargyl 1H-imidazole-1-carboxylate.

5. Cellulose ether according to claim 1, wherein the cellulose ether has alkyl and/or hydroxyalkyl groups in addition to the 3-azido-2-hydroxypropyl groups.

6. Cellulose ether according to claim 5, wherein, for hydroxyalkyl celluloses having 3-azido-2-hydroxypropyl groups, the MS(hydroxyalkyl) ranges from 1.0 to 4.0.

7. Cellulose ether according to claim 5, wherein the alkyl groups are straight-chain ($C_1$-$C_6$) groups.

8. Cellulose ether according to claim 5, wherein the alkyl groups are methyl or ethyl groups.

9. Cellulose ether according to claim 5, wherein the hydroxyalkyl groups are 2-hydroxyethyl or 2-hydroxypropyl groups.

10. Cellulose ether according to claim 9, wherein, for alkylhydroxyalkyl celluloses having 3-azido-2-hydroxypropyl groups, the DS(alkyl) is in the range from 1.0 to 2.5, and the MS (HE or HP) is in the range from 0.01 to 1.0.

11. Cellulose ether according to claim 1, wherein the $MS_{AHP}$ ranges from 0.01 to 0.50.

12. Cellulose ether according to claim 1, wherein the $MS_{AHP}$ is in the range from 0.05 to 0.25.

13. Cellulose ether according to claim 1, wherein said cellulose ether has an average degree of polymerisation $DP_n$ of 50 to 3000.

14. Method for adjusting the rheological properties and the water retention of aqueous solutions or for adjusting the theological properties of non-polar organic solutions comprising adding cellulose ether as claimed in claim 1 to said aqueous solutions or said non-polar organic solutions.

\* \* \* \* \*

UNITED STATES PATENT AND TRADEMARK OFFICE
CERTIFICATE OF CORRECTION

PATENT NO. : 9,434,787 B2
APPLICATION NO. : 14/645700
DATED : September 6, 2016
INVENTOR(S) : Kleinert It is certified that error appears in the above-identified patent and that said Letters Patent is hereby corrected as shown below:

In the Specification

Column 4, Line 11:
Delete "H-C=C-$R^4$" insert -- H-C≡C-$R^4$ --

Column 4, Line 39:
Delete "H-C=C-$R^5$-C=C-H" insert -- H-C≡C-$R^5$-C≡C-H --

In the Claims

Column 8, Line 3:
Delete "H-C=C-$R^4$" insert -- H-C≡C-$R^4$ --

Column 8, Line 31:
Delete "H-C=C-$R^5$-C=C-H" insert -- H-C≡C-$R^5$-C≡C-H --

Signed and Sealed this
Seventeenth Day of March, 2020

Andrei Iancu
*Director of the United States Patent and Trademark Office*